Oct. 19, 1965 T. PADEK 3,212,518
DAIRY CLEANING APPARATUS
Filed Feb. 5, 1963 3 Sheets-Sheet 1

INVENTOR.
TED PADEK
BY
*E. F. Bard*
ATTORNEY

3,212,518
DAIRY CLEANING APPARATUS
Ted Padek, 6740 E. 25th Place, Tulsa, Okla.
Filed Feb. 5, 1963, Ser. No. 256,456
3 Claims. (Cl. 137—334)

This is a continuation-in-part of a copending application for Letters Patent having Serial Number 128,637, and filed July 27, 1961, for dairy cleansing apparatus, now abandoned.

This invention relates to cleansing methods and apparatus, and is particularly directed to apparatus providing a pressured and heated stream of detergent solution.

Detergency is defined by the standard dictionaries as cleansing power, and a "detergent" is accordingly any agent which cleans. However, these definitions are considerably broader than the meaning usually attached thereto, singe detergency usually is thought of as the enhanced effect contributed, by a selected agent, to a liquid bath used to cleanse the surfaces of a solid object. This agent, or detergent, acts by altering the interfacial effects at the various phase boundaries, within a detersive system, by some physiochemical action other than simple solution. The term "detersive system," as used herein, includes not only a detergent but also the surface it is intended to clean, the soil it is intended to remove from the surface, the bath, and any mechanical force also utilized.

No industry is more critically concerned with sanitation, however, than the dairy industry. That part of the dairy industry involved in the supplying of fluid milk to the consumer has for many years been subjected to much inspection and control in order to minimize the danger to human life of milk infections. Oddly, fresh milk is known to have a germicidal property, although the nature of the action involved is unknown. Certain investigators ascribe the phenomenon to agglutination of micro-organisms present in the milk; others attribute a bacteriostatic effect to milk. In any event, this germicidal capability does not continue beyond a few hours after the milk is drawn from the cow, and is presently of no commercial importance. Moreover, the milk thereafter becomes particularly susceptible to infection and contamination of many types. Under modern conditions of production, transportation, processing, and distribution, much equipment and many people are involved. Careful sanitary control is accordingly necessary all along the line.

In all of the foregoing steps, the milk is primarily handled by machinery in preference to manpower. Not only is manpower usually more costly, but machinery is usually easier to control insofar as sanitation is concerned. All of this equipment, and its environment, presents a problem in detergency which is difficult to solve. Although it is true that 90% or more of all organisms in the milk are destroyed by pasteurization, many survive and are passed on to the consumer. This surviving bacteria may be principally categorized as either thermophilic or thermoduric, and both types are usually present. The thermophilic organisms grow at the pasteurization temperature, and therefore operation of the pasteurization equipment for extended periods without sterilization at frequent intervals may permit the growth of large numbers of these organisms. On the other hand, thermoduric organisms survive pasteurization and must therefore be eliminated by a sterilizing detergent process.

One of the most costly and time-consuming operations in any milk producing and processing system is the washing and sterilizing of dairy equipment. The first step is to rinse with cold or lukewarm water immediately after use. Manual brushing is usually undertaken during this step to remove any visible milk solids. After this rinsing, the equipment is flushed with a warm detergent solution.

Much study has been made on the type of detergent agent which will be most effective in cleaning dairy equipment. The detergents used are generally combinations of caustic soda, soda ash, and various silicates and phosphates. Most dairy detergents now also contain calcium-sequestering agents such as polyphosphates, as well a substances for lowering surface tension.

Unfortunately, each item of milk-handling equipment presents a particular detergency problem since, as hereinbefore stated, the overall effect of any detergent in any given detersive system (the combination of surface, soil, and bath) depends, first of all, upon the nature of that system. Obviously, the same methods and apparatus, that is effective for cleaning a farmer's milk cans, will not necessarily be equally effective for cleaning a filter. Thus, many dairies have cleaning manuals which give instructions for cleaning each piece of equipment such as weigh cans, holding vats, the large metal and glass-lined storage tanks, pasteurizers, coolers, piping, bottles, etc. In addition, special cleaning equipment is also employed. For example, continuous flow heaters may be cleaned with a portable rotary pipe-brush propelled by a motor; water is introduced simultaneously with the brush to avoid its burning by friction.

It would be unfair, as well as inaccurate, to suggest that the various cleaning methods and apparatus now in use have failed to provide sanitary conditions in the dairy industry. The fact that astronomical quantities of milk are consumed daily without ill effect testifies to the effectiveness of present methods and apparatus. Nevertheless, it is a fact that no single operation in a dairy requires as many man-hours as does the cleaning process, and it is also a fact that, notwithstanding the efficiency of present methods and apparatus, successful dairy sanitation is presently measured in terms of a minimum of bacteria rather than in terms of a complete absence of bacteria. None of the present apparatus or methods, which are practical, will guarantee a negative bacteria count. The present invention, however, will both clean and sterilize with the expenditure of a minimum of man hours. Moreover, the test of an adequate cleaning process, when performed with the present invention, is a negative bacteria count. It is for this reason that the present invention has been received so enthusiastically by the dairy industry.

The advantages of the present invention are preferably attained by apparatus which provides a stream of detergent solution at a temperature which is sufficient to eliminate the thermoduric organisms, and at a pressure sufficient to provide the degree of mechanical force required for the types of detersive systems expected to be found in the dairy industry.

It is an object of the present invention, therefore, to provide a new and useful apparatus for cleaning objects.

It is further an object of the present invention to provide novel apparatus for cleaning and sterilizing the surfaces of objects.

It is further an object of the present invention to provide novel apparatus for cleaning and sterilizing food-processing apparatus.

It is a specific object of the present invention to provide novel apparatus for providing a pressured stream of liquid at a pre-selected temperature, said apparatus comprising a supply of liquid, means interconnected to said supply for delivering a stream of said liquid to a first junction under a pressure, means connected to said first junction for dividing said first stream into second and third streams and for blending said second and third streams at a second junction into a fourth stream, heating means thermally connected about said second stream, means connected across said third stream for varying the rate of flow of said third stream, and a temperature sensor interposed in said fourth stream downstream of said second junction.

These and other objects and features of the present invention will be apparent from the following detailed description wherein reference is made to the following drawings.

Figure 1:
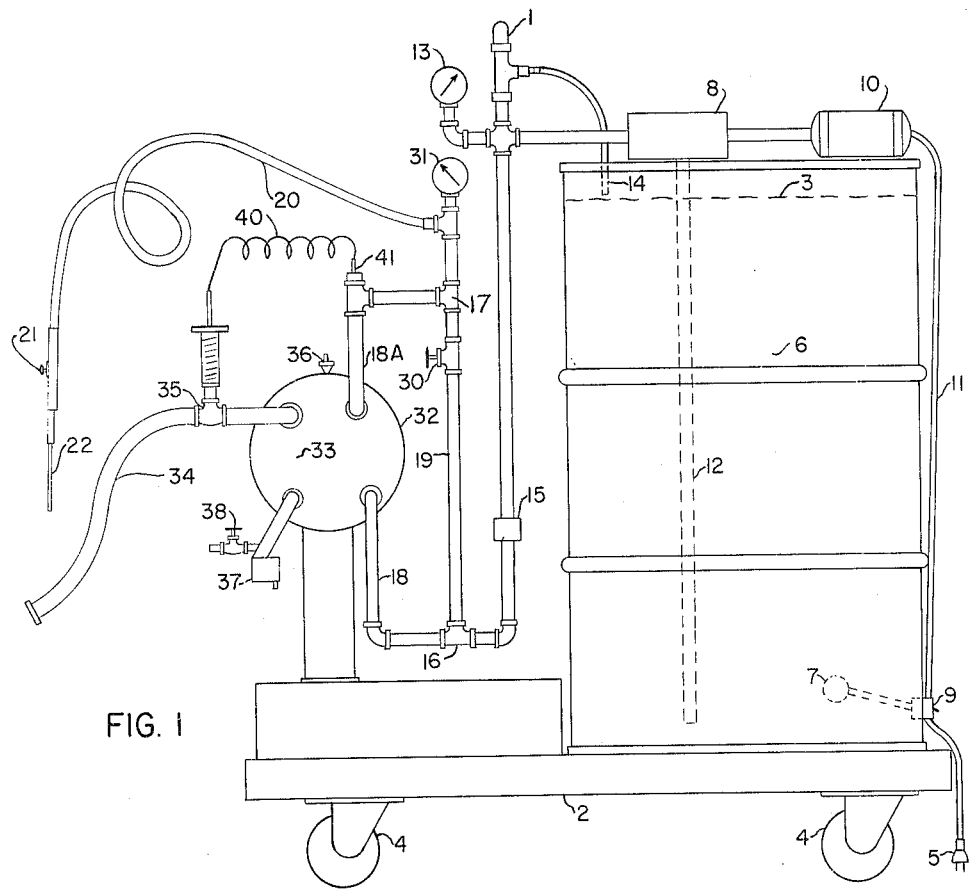
FIGURE 1 is a pictorial representation of one form of the present invention.

In that form of the invention chosen for purposes of illustration in the drawings, FIGURE 1 shows a platform 2 mounted on casters 4 to provide a dolly-type base which may be conveniently moved to various locations. Mounted on a platform 2 is a vat-type tank 6 for containing a supply of liquid detergent. A pump 8, which may be operated by an electric motor 10, is mounted on or near the tank 6 in a manner to receive liquid detergent through an intake pipe 12. If the pump 8 and motor 10 is devised for continuous operation, the pump 8 may also be provided with a return pipe 14 to return excess fluid to the tank 6 as hereinafter explained. The electric motor 10 is provided with a lead 11 which is connected through a cut-off switch 9 to a plug 7. The cut-off switch 9 is preferably actuated by the position of a float 7 which is adapted to open the cut-off switch 9, and thereby de-activate the motor 10, when the level 3 of the detergent fluid drops to a point below the mouth of the intake pipe 12.

The purpose of the apparatus depicted in FIGURE 1 is to provide a pressured stream of hot detergent solution to the surface sought to be cleaned. Since some surfaces may be relatively inaccessible with respect to other surfaces, it is desirable that such inaccessibility be overcome, partly by providing the stream at a high pressure, and partly by providing that the stream be capable of being aimed as desired. The pressuring force is, of course, provided by the pump 8, and, as depicted in FIGURE 1, the aiming capability is attained by providing that the fluid be discharged through at least one hose 20 or other flexible tube, and through a nozzle 22 connected thereto. The nozzle 22 is preferably equipped with a push-button valve 21 which must be pressed in order for the pump 8 to discharge fluid through the nozzle 22. When the push-button valve 21 is released, the fluid is driven through the return pipe 14 and returned to the tank 6. Thus, it may be desirable to provide a pressure gauge 13 to indicate the pressure being provided to the fluid by the pump 8.

When the push-button valve 21 is opened, the pump 8 drives the fluid through a first check valve 15 which is provided to prevent back-flow in the system. After passing the first check valve 15, the pressured fluid may pass through a first junction 16 to a second junction by means of either a first route 18 and 18–A, or by means of both the first route 18 and 18–A and a second route 19. The purpose of the first route 18 and 18–A is to provide a means by which at least part of the fluid reaching the second junction 17 may be heated to a temperature which will intensify both the detergency and the germicidal capability of the fluid ejected through the nozzle 22. The second route 19 is provided with a means for flow control, which may be a gate valve 30. Thus, the unheated fluid passing through the second route 19 may be blended as desired with the heated fluid arriving at the second junction 17, by way of the first route 18 and 18–A, to provide selective control of the temperature of the fluid passing to the hose 20 and nozzle 22. Thus, it is particularly useful to provide a temperature indication means 31, such as a thermometer, at a point immediately downstream from the second junction 17.

Any type of heating means may be used which is capable of sufficiently raising the temperature of the fluid passing through the first route 18 and 18–A. As depicted in FIGURE 1, a particularly effective heating means is a heat exchanger 32 comprising, essentially, a coil of tubing connected to form an integral part of the first route 18 and 18–A, and a steam jacket 33 disposed about the tubing coil. The steam jacket 33 may be provided with a flexible steam intake conduit 34, and a steam control valve 35 to regulate the amount of steam entering the steam jacket 33. The steam jacket 33 is preferably equipped with a steam outlet assembly, comprising a trap 37 and a by-pass valve 38, and with a relief valve 36 as provision for failure or malfunction of the steam control valve 35. In that form of the present invention depicted in FIGURE 1, the steam control valve 35 may be positioned by the action of a diaphragm (not depicted) which is adapted to operate by a pressure. The pressure may be supplied to the diaphragm by means of a capillary tube 40 which is connected to a temperature sensor 41, which produces a pressure in the capillary tube 40 functionally related to the temperature of the fluid passing to the second junction 17 via the second route 18–A. Thus, the steam control valve 35 may be adjusted to constantly control the amount of steam entering the jacket 33 of the heat exchanger 32.

Figure 2:
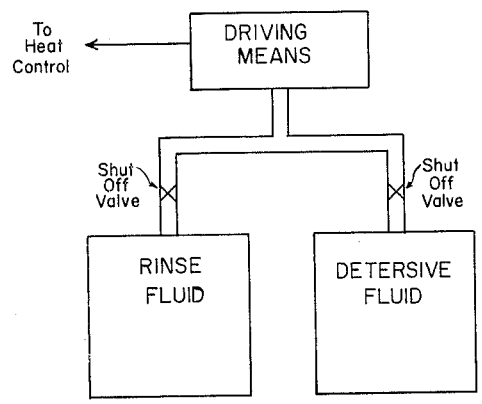
FIGURE 2 is a functional representation of a modified form of the apparatus depicted in FIGURE 1.

Of course, a complete cleansing operation preferably includes a rinsing operation. Thus, the detergent solution may be replaced in the tank 6 with a rinsing solution, such as a water containing a germicidal agent. Alternatively, it may be desirable to provide the tank 6 with at least two compartments, one of which would contain the detergent solution and the other of which would contain the rinsing solution. In such a case, the pump 8 should be provided with means for taking fluid selectively from either compartment. It may be desirable to include two sets of level controls, such as the cut-off switch 9 and float 7, in each compartment. This alternative is functionally depicted in FIGURE 2.

Any means may be provided for delivering fluid from the tank 6 to the first junction 16. For example, instead of the pump 8 depicted in FIGURE 1, a supply of compressed air may be used if the tank is suitably adapted. In addition, a relief valve 1 is very useful at a point between the pump 8 and the first junction 16, if it is preset to open under the pressure created by the pump 8 when the push-button valve 21 is closed, in order to divert the pressured fluid back to the tank 6 through the return pipe 14. Of course, if a two-compartmented tank 6 is used as described in the foregoing paragraph, then the return pipe 14 should be provided with means for selectively connecting it to the compartment which is supplying fluid to the pump 8. Otherwise, the detergent and rinsing solutions may become mixed. Both the intake pipe 12 and the return pipe 14 may be comprised of flexible tubes which may be manually shifted to the selected compartment. Alternatively, two intake pipes (not depicted) may be connected to the pump 8 through a selector valve, and two return pipes (not depicted) may be likewise connected to the relief valve 1 through a selector valve. Both selector valves may be operated by a common handle to assure that they are always properly positioned with respect to each other.

As hereinbefore stated, any type of heating means may be used which is capable of sufficiently raising the temperature of the fluid passing through the first route 18 and 18–A. The steam-operated heat exchanger 32 depicted in FIGURE 1 is particularly desirable since most dairies are equipped with an adequate supply of steam, and because steam is inherently clean in and of itself. However, the heating means incorporated between route 18 and route 18–A may be a gas-fired burner, or it may be an electric heating element provided it is suitably adapted and controlled.

Figure 3:
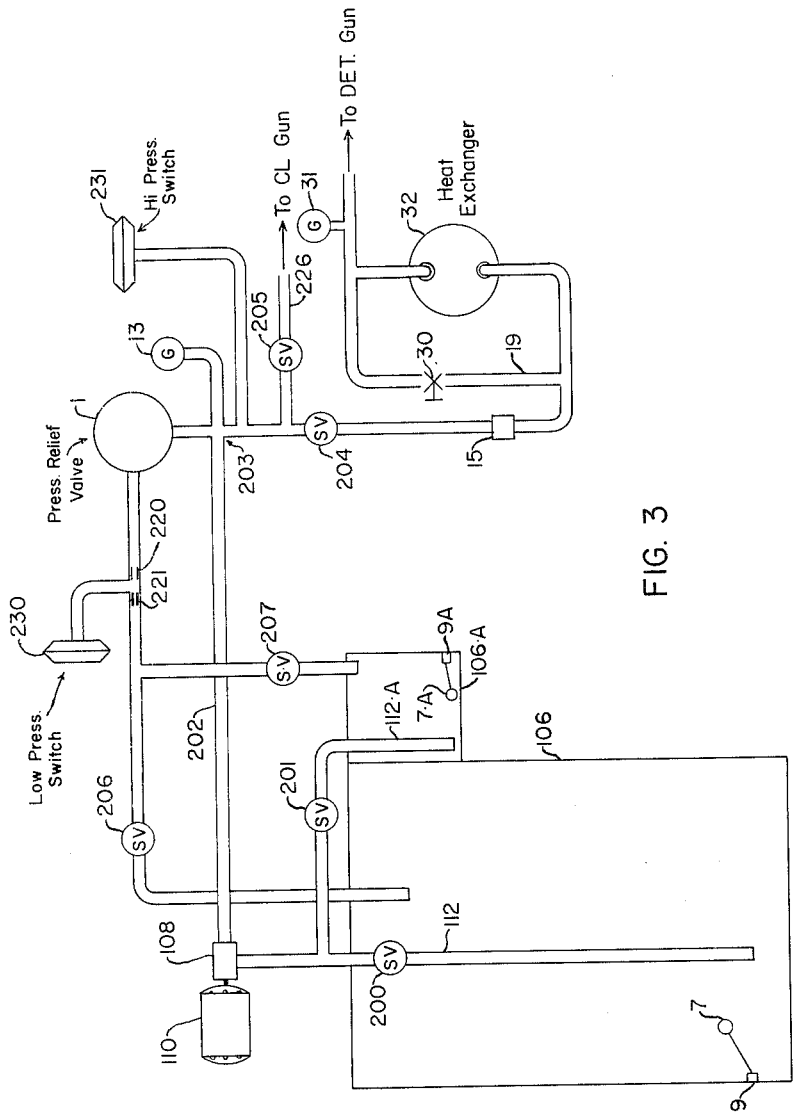
FIGURE 3 is a pictorial representation of another form of the present invention.
Figure 4:
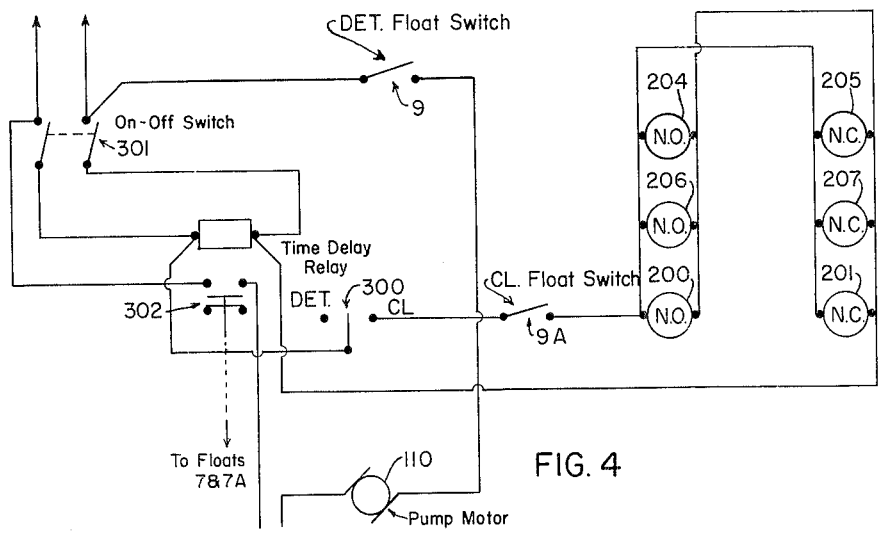
FIGURE 4 is a schematic representation of a portion of the apparatus depicted in FIGURE 3.

FIGURES 3 and 4 depict another form of the present invention wherein provision is made for the application of a germicidal agent after the cleansing sequence has been completed. Referring now to FIGURE 3, there may be seen a tank 106, a motor 110, a pump 108, and an intake pipe 112, all similar to that depicted in FIGURE 1. In this arrangement, the tank 106 is generally provided with only a chamber for a detergent solution, and a separate tank 106-A is provided for holding a germicidal solution of any suitable character. The pump 108 takes fluid from tank 106-A through intake pipe 112-A, and solenoid shut-off valves 200 and 201 are provided so that a selection may be made between the fluids contained in tanks 106 and 106-A. Alternatively, tank 106-A, intake pipe 112-A, and shut-off valve 201 may be the subject of a separate and independent system, or may be omitted entirely.

When detergent fluid is being withdrawn from tank 106, shut-off valve 200 is open and shut-off valve 201 is closed. Fluid passes from the pump 108 through conduit 202 to a junction 203 where it is directed to the pressure relief valve 1 depicted in FIGURE 1, and to solenoid shut-off valves 204 and 205. As will also be hereinafter explained, shut-off valve 204 is normally open and shut-off valve 205 is normally closed. Thus, fluid will normally be blocked from passing through hose 226 to the germicide nozzle (suggested but not depicted in FIGURE 3), but will pass through valve 204 to the heat exchanger 32 and by-pass conduit 19 shown in FIGURE 1 in detail, and therefrom to the detergent dispensing nozzle (also suggested but not depicted in FIGURE 3). Solenoid shut-off valve 204 therefore must coordinate with solenoid shut-off valve 200, and both must be opened or closed together. Similarly, solenoid shut-off valve 205 must operate coordinately with valve 201.

It may be seen that fluid will flow from junction 203, through the pressure relief valve 1 depicted in FIGURE 1, and through a first orifice 220 to a first pressure-actuated electric switch 230. From the first orifice 220, the flow will continue through a second orifice 221 to tank 106, or to tank 106-A, depending upon the condition of solenoid shut-off valves 206 and 207. Valves 206 and 208 are also preferably adapted to operate oppositely to each other; i.e., when valve 206 is open, then valve 207 should be closed, etc.

FIGURE 4 shows the wiring diagram for the apparatus depicted in FIGURE 3. It will be noted that the various solenoid shut-off valves 200, 201, and 204–207, are interconnected in parallel. Valves 200, 204, and 206 are normally open, and valves 201, 205, and 207 are normally closed. Thus, when selector switch 300 is positioned at DET, fluid will flow only from tank 106, and through conduit 18 and the heat exchanger 32, to the detergent nozzle, (provided pump motor 110 is activated). However, if selector switch 300 is positioned at CL, then fluid will flow only from tank 106-A to the germicide dispensing nozzle. Float switches 9 and 9-A, which are located in or adjacent tanks 106 and 106-A respectively, must both be closed or the pump motor 110 will be inactivated. Included in the power circuit to the pump motor 110 is an on-off switch 301 and a time delay relay 302. As may be seen, when the on-off switch 301 is closed, power is applied to the solenoid of the time delay relay 302. The relay 302 will then close to energize the pump motor 110 provided the detergent float switch 9 is closed. Both floats 7 and 7-A depicted in FIGURE 3 are connected to relay 302, so that if either tank 106 or 106-A is exhausted, one or both of switches 9 and 9-A will be opened. However, if switch 9-A is opened, then valves 201, 205, and 207 will automatically close to cut off the germicide system, and valves 200, 204, and 206, will automatically open. Pump motor 110 will continue to operate for a short interval (preferably about 5 seconds) due to the delay of relay 302 in opening, and thus the system will purge itself of the germicidal solution. On the other hand, if selector switch 300 is positioned at DET, and float switch 9 opens due to exhaustion of the fluid in tank 106, then the system will still purge itself because of the 5 second delay before relay 302 opens to cut off the pump motor 110. Even if the on-off switch 301 is opened during operation of the system, the system will still purge itself (with detergent) since valves 200, 204, and 206 will instantly open, valves 201, 205, and 207 will instantly close, but relay 302 will not open until the predetermined delay interval has expired. Furthermore, it may be seen that it is immaterial to the system whether the selector switch 300 be positioned at CL or at DET.

Figure 5:
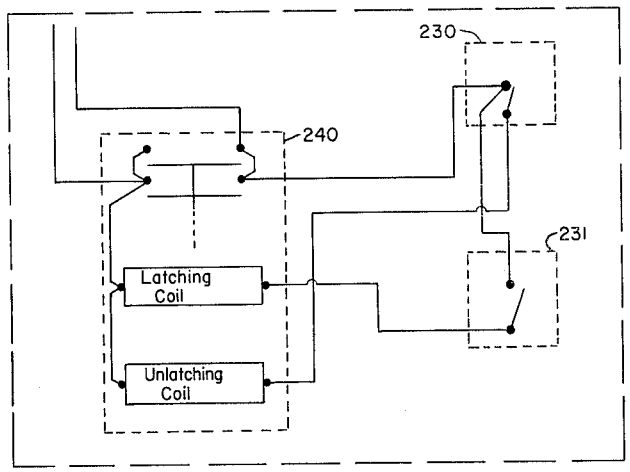
FIGURE 5 is a schematic representation of another portion of the apparatus depicted generally in FIGURE 3.

Referring now to FIGURE 5, there may be seen a schematic diagram of the remote control circuitry suggested but not depicted in FIGURE 4. The remote control circuitry includes the pressure switches 230 and 231 depicted in FIGURE 3, and a latching-unlatching relay 240, all interconnected between the pump motor 110 and the time delay relay 302 depicted in FIGURE 4. During operation of the system, pressure switch 230 is in its normally open condition, and pressure switch 231 is in its normally closed condition. Thus, current will pass through the time delay relay 302 (see FIGURE 4), through the latching coil of the relay 240, through pressure switch 231, to the pump motor 110. Thus, relay 240 will be held in its latched and closed condition, to close the circuit between the time delay relay 302 and the pump motor.

However, if the gun valve is closed on whatever nozzle may then be in use, a surge of back pressure will be developed in the system due to the continued operation of the pump motor 110. This surge of back pressure will pass through the pressure relief valve 1, and through orifices 220 and 221, through whichever of valves 206 and 207 happens to be open. Since orifice 220 is preferably slightly larger than orifice 221, the surge of back pressure will cause pressure switch 230 to close. Thus, current will flow through the unlatching coil of relay 240, and power will be disconnected from pump motor 110. Furthermore, check valve 15 (see FIGURES 1 and 3) traps this increased pressure in the system to keep pressure switch 231 open. (Pressure switch 231 is preferably adapted to respond only to a substantially greater pressure differential than that sufficient to actuate pressure switch 230.) When the referred-to gun valve is again opened, the pressure in the system is substantially decreased, and pressure switch 231 will thereupon open. Thus, pressure switch 231 will close to pass power through the latching coil of relay 240, and power will again be connected to pump motor 110.

Numerous other variations and modifications may obviously be made without departing from the invention. Accordingly it should be clearly understood that the forms of the invention described above and shown in the figures of the accompanying drawings are illustrative only, and are not intended to limit the scope of the invention.

What I claim is:

1. Apparatus for providing a heated and pressured stream of fluid, said apparatus comprising a container means having a first compartment and a second compartment, a detergent fluid disposed in said first compartment, a rinsing fluid disposed in said second compartment and containing a germicidal agent, a pressuring means having an intake port and an outlet port and adapted to receive and to deliver fluid, means for selectively connecting said intake port to one of said compartments in a manner such that said pressuring means withdraws quantities of fluid from said selectively connected compartment and expels said withdrawn fluid through said outlet port at a substantially steady flow rate, a first conducting means connected to said outlet port of said pressuring means and adapted to receive and to divide said expelled fluid into a first flow and a second flow, a heating means, a first routing means connected to receive and to conduct said first flow past and in thermal contact with said heating means to a junction point, a second selectively restrictable routing means connected to receive and to conduct said second flow to said junction point in a manner such that said second and first flows become blended at said junction point, a flexible second conductor connected to said junction point to receive said blended first and second flow and adapted to permit said blended streams to eject therefrom in the form of at least a single stream, valve means interconnected with said flexible second conductor, and control means arranged and adapted to deactivate said pressuring means in response to the surge of back pressure developed when said valve means interrupts flow through said flexible second conductor and to activate said pressuring means when said valve means permits flow through said flexible second conductor.

2. The apparatus described in claim 1, wherein said control means includes a pressure trap interconnected with said first conducting means, and means responsive to a surge of pressure in said pressure trap for deactivating said pressuring means.

3. The apparatus described in claim 2, wherein said pressure trap includes a pair of spaced apart orifices.

References Cited by the Examiner
UNITED STATES PATENTS

| | | | |
|---|---|---|---|
| 2,128,263 | 8/38 | Ofeldt | 239—135 X |
| 2,851,053 | 9/58 | Wollner et al. | 137—567 X |
| 2,987,259 | 6/61 | Lindquist | 239—130 |

M. CARY NELSON, *Primary Examiner.*

EVERETT W. KIRBY, MARTIN P. SCHWADRON,
*Examiners.*